United States Patent [19]
Davis

[11] Patent Number: 5,960,127
[45] Date of Patent: Sep. 28, 1999

[54] EFFICIENT METHODS OF PERFORMING MORPHOLOGICAL OPERATIONS

[76] Inventor: Michael Davis, 2594 Loeffler, Chelsea, Mich. 48118

[21] Appl. No.: 08/740,189

[22] Filed: Oct. 28, 1996

[51] Int. Cl.⁶ .............................. G06K 9/42; G06K 9/44; G06K 9/56; H04N 1/40
[52] U.S. Cl. ......................... 382/308; 382/256; 382/257; 358/447
[58] Field of Search .................................. 382/257, 173, 382/282, 308, 307, 256; 358/447

[56] References Cited

U.S. PATENT DOCUMENTS

| | | | |
|---|---|---|---|
| 3,821,948 | 7/1974 | King | 128/2.06 A |
| 3,986,000 | 10/1976 | McJohnson | 235/61.11 E |
| 4,590,607 | 5/1986 | Kauth | 382/257 |
| 4,665,554 | 5/1987 | Sternberg | 382/308 |
| 4,718,028 | 1/1988 | Gussin et al. | 364/572 |
| 5,129,014 | 7/1992 | Bloomberg | 382/257 |
| 5,148,500 | 9/1992 | Belanger | 382/308 |
| 5,168,147 | 12/1992 | Bloomberg | 235/456 |
| 5,337,370 | 8/1994 | Gilles et al. | 382/14 |
| 5,351,307 | 9/1994 | Prejean-Lefevre | 382/8 |
| 5,619,592 | 4/1997 | Bloomberg et al. | 382/257 |

OTHER PUBLICATIONS

Ingemar "Fast Erosion and Dilation by Contour Processing and Thresholding of Distance Maps", Elsevier Science Publishers Mar. 1992.

Van, et al "A Contour Processing Method for Fast Binary Neighbourhood Operations", Elsevier Science Publishers Jan. 1988.

Zhuang "Morphological Structuring Function Decomposition", IEEE Mar. 1992.

Morales, et al "Morphological Pyramids with Alternating Sequential Filters", Jul. 1995.

Camps, et al "Gray-Scale Structuring Element Decomposition", IEEE Jan. 1996.

*Primary Examiner*—Bipin Shalwala
*Assistant Examiner*—Daniel G. Mariam
*Attorney, Agent, or Firm*—Gifford, Krass, Groh, Sprinkle, Anderson & Citkowski, PC

[57] ABSTRACT

A decaying, propagating reference signal allows for the efficient implementation of various image morphological operations, including grayscale dilations and erosions, with only two passes through the image. Pyramid and other morphological shape operators can be duplicated by varying the decay rate(s) of the reference signal, the offset directions and magnitudes of the comparison vector(s), and the paths and number of passes through the image. The methods may also be performed in parallel on the same input image to generate an adaptive threshold image defined as the biased average of an image separately transformed by a dilation and by an erosion. Applications of the technique in one and two dimensions are disclosed.

13 Claims, 3 Drawing Sheets

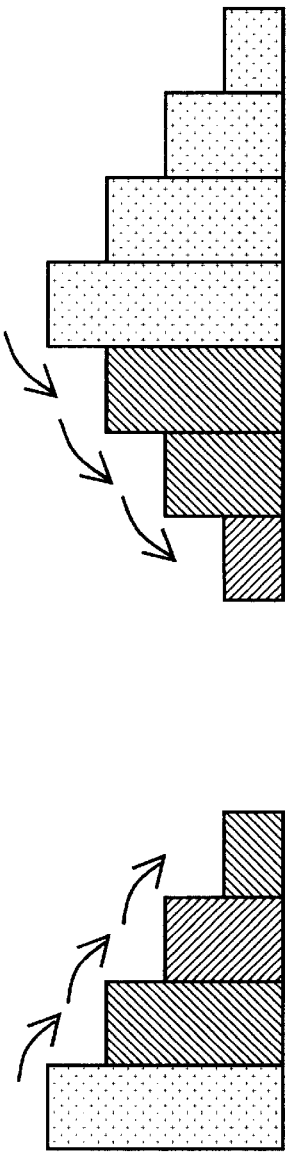
*Fig - 3B* (REVERSE PASS)
*Fig - 3A* (FORWARD PASS)
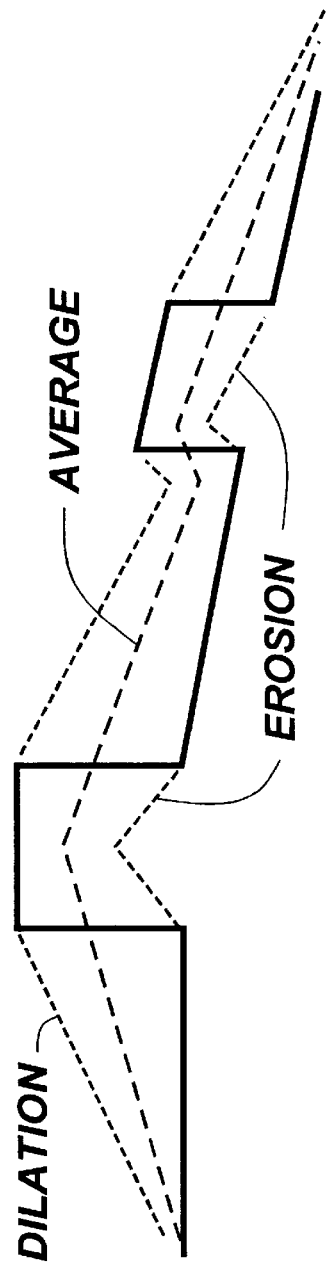
*Figure - 5*

EFFICIENT METHODS OF PERFORMING MORPHOLOGICAL OPERATIONS

FIELD OF THE INVENTION

The present invention relates generally to image processing, and, more particularly, to a method of performing morphological operations on an image with a minimum of passes through the image. A highly efficient adaptive threshold technique is also disclosed which takes advantage of the above morphological techniques.

BACKGROUND OF THE INVENTION

Due to lighting and reflection variations, foreign matter and other factors, it is common in image-processing fields such as machine vision to apply image-transformation operations to increase the ratio of signal-to-noise. The opening and closing operators may be further defined as the sequential application of a dilation and an erosion. The opening transform (an erosion followed by a dilation) "cuts out" noise spikes (grayscale regions surrounded by relatively lower intensity regions), whereas the closing operation (a dilation followed by an erosion) "fills in" valleys (grayscale regions surrounded by relatively higher intensity regions). One existing technique is to apply an "opening" followed by a "closing" (or vice versa) to perform what is called a "background normalization" operation, wherein image intensity regions whose spatial extent is less than that of the morphological "shape," are smoothed out and thus removed from the image.

Such techniques for eliminating intensity regions based upon size and relatively higher or lower grayscale variations can also be used to extract desired "foreground" regions. The foreground regions can be emphasized by first copying the original or background normalized image, filtering out the foreground shapes, and then subtracting the filtered image from the original image, leaving only the filtered objects. Filtering large shapes using current methods is computationally expensive, however, since the number of passes through an image is minimally proportional to the natural logarithm of the size of the shape.

A second means of extracting the foreground of an image is to define a "threshold" or intensity value which allows foreground versus background classification based upon a grayscale value. This "binarization" operation is based solely upon the comparison of each pixel's grayscale value with that of the threshold value. Images which have large intensity variations due to lighting or reflectivities cannot be classified using this single threshold technique, and an adaptive or spatially variant threshold is therefore necessary for classification in these instances.

The techniques described above are generally well known in the field of image processing. The inherent drawbacks of such techniques are also notorious. One of the most severe limitations relates to the number of passes through an image necessary to perform any morphological operation using large shapes. Thus, techniques which could improve the throughput of these operations would be readily embraced by those practicing in these and related fields, particularly if accuracy and resolution are not degraded while enhancing performance.

SUMMARY OF THE INVENTION

The present invention supports highly efficient morphological operations by introducing a decaying, forward propagating reference signal. Applying this method to image processing allows for an efficient means of implementing grayscale dilations and erosions. In preferred embodiment, this invention can, in grayscale, dilate or erode an image with an arbitrarily sized pyramid shape in only two passes through the image. The method can also be performed in parallel on the same input image to generate an adaptive threshold image defined as the biased average of an image separately transformed by a dilation and by an erosion. Other morphological shape operators can be duplicated by varying the decay rate(s) of the reference signal, the offset directions and magnitudes of the comparison vector(s), and the paths and number of passes through the image.

Broadly, according to the invention, an internal variable is initialized and, upon indexing through an image in each dimension, a decay function or rate is added (or subtracted) to the value of the internal variable and, at each pixel location and qualifying adjacent pixel locations, the intensity values of the image are compared to the internal variable value. If the image intensity values are greater than the value of the internal variable (or less than, depending upon the circumstances), the intensity values at the current pixel location and that of the adjacent pixel are potentially overwritten. Again, depending upon the circumstances, the value of the internal variable may also be overwritten with the intensity value at the current location, as discussed in the detailed description.

The steps of the method are repetitively applied while moving generally from a starting corner toward the corner diagonally opposing the starting corner. The various operations are then repeated on a second pass dimensionally transverse with respect to the first pass, thereby morphologically operating on the entire image in a minimum of just two passes therethrough. The comparison operator (maximum or minimum) determines whether the morphological operation results in a dilation or an erosion. The magnitude of the decay rate controls the size of the structure (that is, larger decay rates decrease the size of the structure), with the polarity of the decay rate being negative during a dilation and positive during erosion. In the preferred embodiment, the internal variable is initialized to a high value relative to the pixel intensities of the image during an erosion operation, and to a low value, preferably zero, during a dilation.

BRIEF DESCRIPTION OF THE DRAWINGS

FIG. 3 illustrates how the present invention duplicates the shape transformation with a decaying reference signal;

FIG. 5 illustrates the adaptive thresholding algorithm.

DETAILED DESCRIPTION OF THE INVENTION

Figure 1:
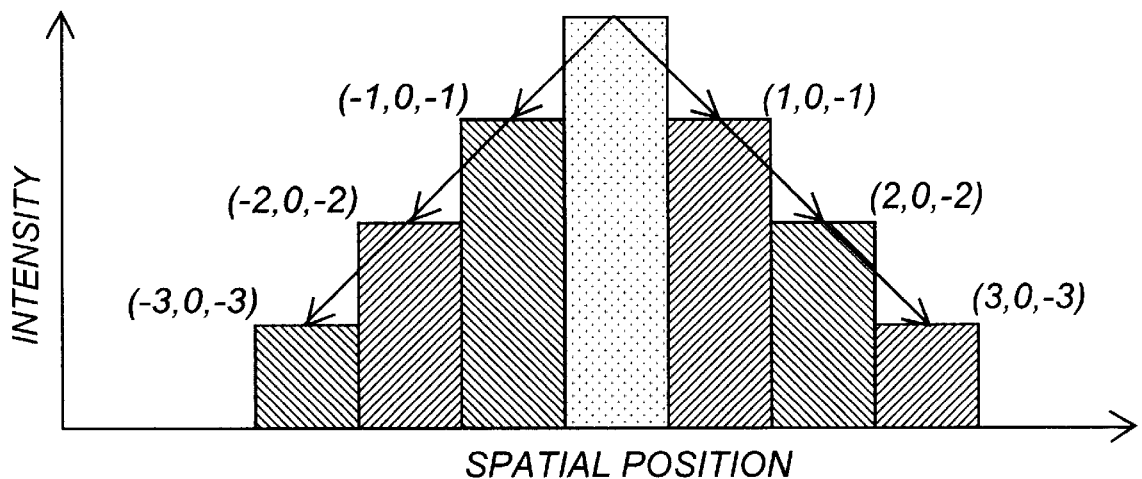
FIG. 1 illustrates a single spatial dimensional grayscale type of shape used in morphological operations such as dilations and its equivalent simultaneous displacement vector descriptors.
Figure 2A:
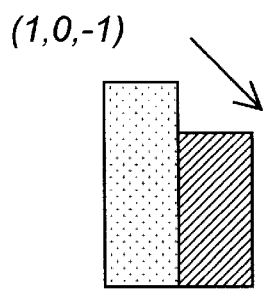
FIG. 2 illustrates the equivalent sequential displacement vector set descriptors and the intermediate results for the shape in FIG. 1.
Figure 2B:
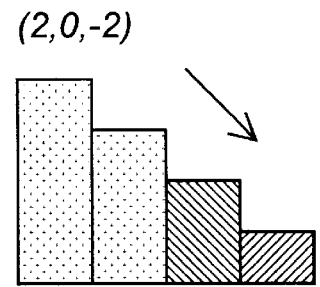
Figure 2C:
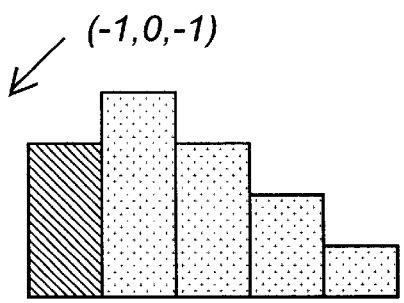
Figure 2D:
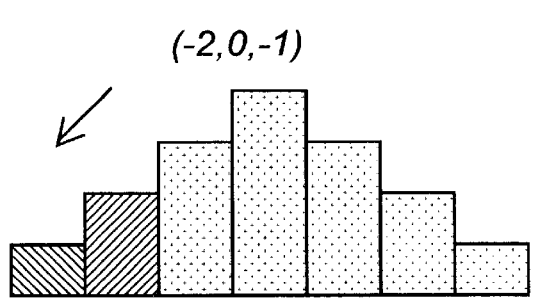

As discussed in the Background of the Invention, opening and closing operations are well-known morphological techniques involving erosion and dilation steps to smooth out discontinuities in gray scale, thereby rendering the desired foreground information more evident. These morphological operations transform images by taking the maximae or minimae of the image, and its copies, which have been simultaneously offset by a set of displacement vectors. An equivalent method of describing the vector set is by the "shape" produced after their application to a single pixel. FIG. 1 illustrates a simple grayscale shape and it equivalent simultaneous vector set descriptors. A reduced vector set description is also possible which describes the operations necessary to generate the shape if the offset and comparison cycles are sequentially applied to the partially transformed image. FIG. 2 illustrates this shape generation process and the vector set for this technique. This invention adds another equivalent description and processing technique which greatly reduces the computational effort necessary to generate the final transformed image. FIG. 3 illustrates a generation process of the shape above using a decaying reference signal technique according to this invention. For the purpose of clarity, the prior-art shape and its descriptors are limited in the above discussions to having spatial extent in only a single dimension. If the shape were to be extended to include the second spatial dimension, the affects on the process characteristics would be as follows: the number of simultaneous vectors and comparison operations required by the first technique would increase to 24, and the number of sequential vectors and comparison operations required by the second technique would increase to 8, and the number of passes required by the third technique would remain at 2, although the number of comparison operations would double to 4.

The number of vectors required by the first technique is equal to the area of the shape minus one. Thus, for symmetric shapes, these increase in proportion to the square of the size of the shape. The vector requirements of the second technique increase in proportion to 2 times the natural logarithm of the size of the shape. The number of passes required for the third technique remains fixed and therefore does not increase with respect to the size of the shape.

A more detailed explanation of a process according to the invention for a single processor configuration operating on a two-dimensional grayscale image would be as follows:

1) Set the current scan line to the top line in the image area of interest;
2) Set the current pixel to the desired start position of the current scan line;
3) Initialize an internal variable value and decay rate;
4) Compare the internal value with the intensity of the current pixel and potentially overwrite the current pixel or the internal variable value, depending upon relative magnitude;
5) Add the decay rate to the internal variable value;
6) Compare the internal value with intensity of the lower adjacent pixel and potentially overwrite the adjacent pixel;
7) Increment the current pixel to the next pixel in the scan line;
8) Repeat 4–7 until the end of the scan line;
9) Increment the current scan line;
10) Repeat 2–9 until the end of the image, ignoring step 6 during the end scan line operation;
11) Repeat 1–10 reversing directions (i.e., end of scan line to start, bottom of image to top, adjacent pixel is above current pixel).

The comparison operator (max or min) determines whether the image is being transformed by a dilation or an erosion operation. The magnitude of the decay rate controls the size of the structure (larger decay rates decrease the size of the structure). The polarity of the decay rate is negative during dilations and positive during erosions. The internal variable is initialized to a high value during erosions, and preferably to zero during dilations.

Figure 4A:
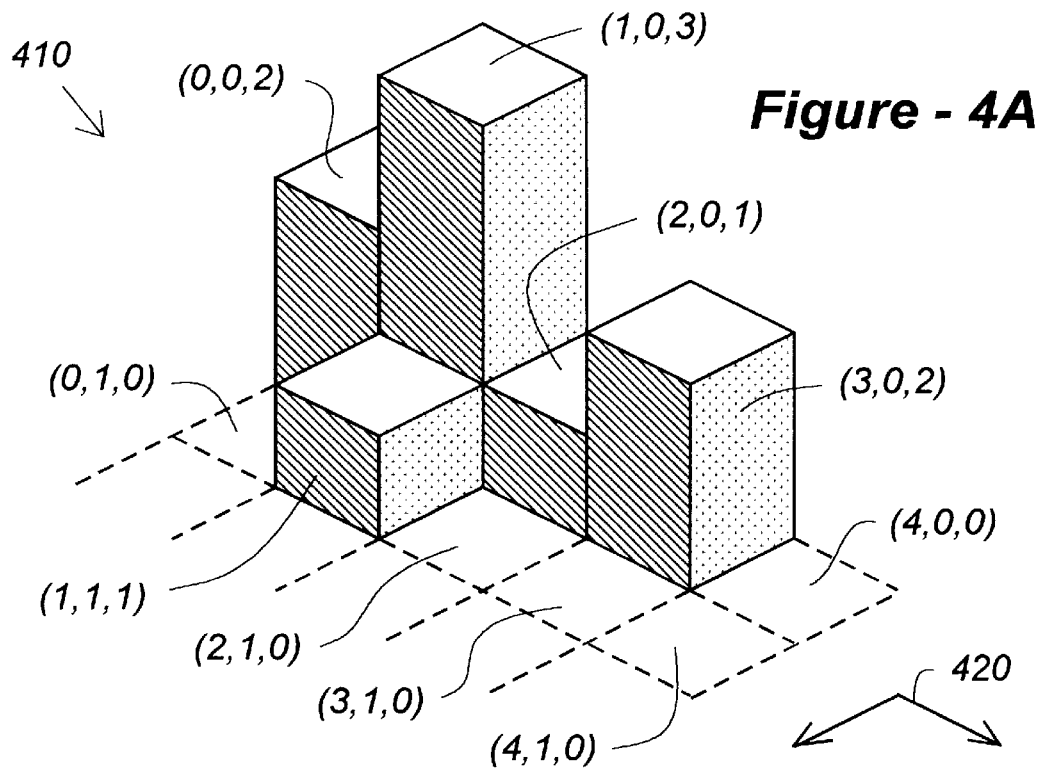
FIGS. 4A and 4B illustrate the application of the invention performing a dilation operation in two dimensions.
Figure 4B:
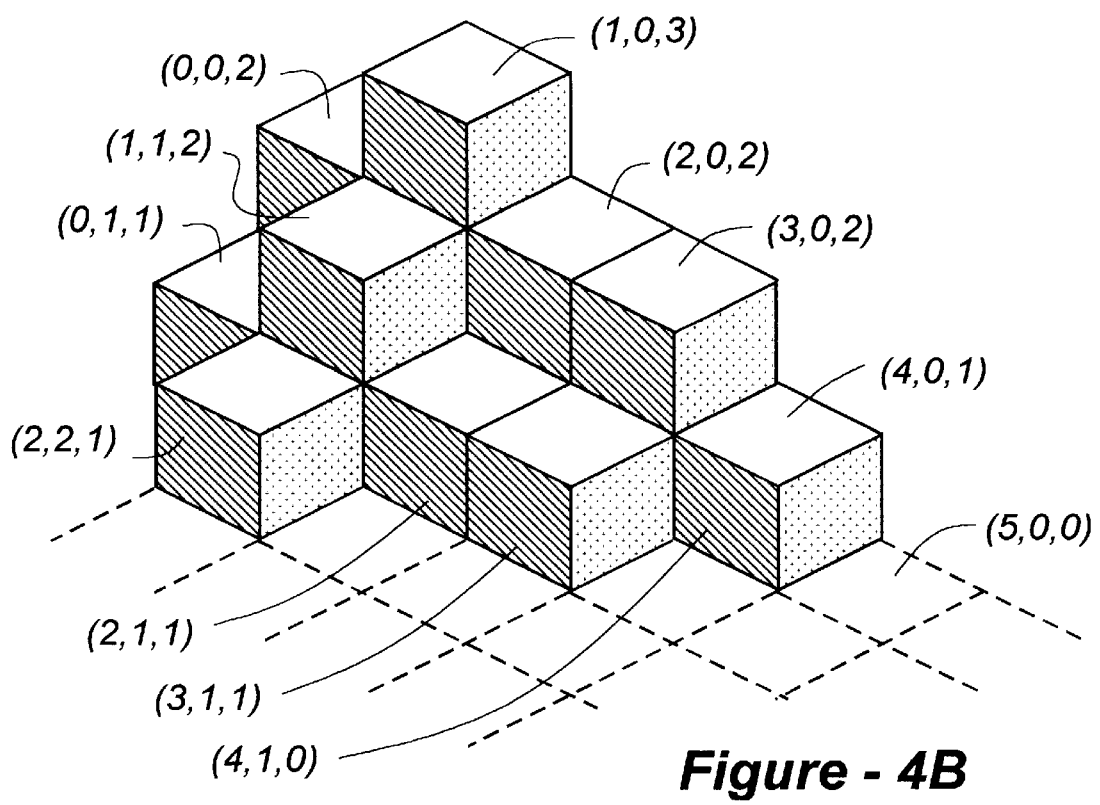

FIGS. 4A and 4B will now be used to show how a small set of pixel intensity values are affected with respect to a dilation operation in two dimensions. It will be apparent to one of ordinary skill in image processing, based upon the discussion above, that the setting of the internal variable value, and its polarity, may be altered to accommodate an erosion in like fashion. It should also be clear that although the various operations described in detail below are on nearest-neighbor adjacent pixels, "jumps" over adjacent pixels may be carried out to accommodate different types of images, aspect ratios, and so forth, depending upon the circumstances. In addition, although a decay rate of unity is used in the following example, greater and/or fractional decay rates may be used and, in fact, the decay rate itself may be a linear or non-linear function.

Now making reference to FIG. 4A, there is shown a set of pixel intensity values at 410 to which the first pass of a dilation operation will be performed according to the invention. Reference will also be made to FIG. 4B, which shows the result after application of the method. In both FIGS. 4A and 4B, a set of three values in parentheses will be used to identify each pixel, with the first value being indicative of X position, the second value being indicative of Y position, and the third value being indicative of the Z position, or intensity, as measured upwardly from the base of the drawing. The process will begin at pixel (0,0,2) and progress "rightwardly" as indicated by the direction arrow 420 and "downwardly" to the row below and adjacent to the row of pixels along path 420. Thus, pixel (0,0,2) may represent the upper-left hand corner of the image, with path 420 indicating the top row of pixels, and so forth, with the understanding that the invention need not start in the actual image corner, but instead may be applied to a subset of pixels within a larger image.

This example being a dilation operation, the value of the internal variable is first set to zero, then applied to the first pixel at (0,0,2). Though the addition of the decay rate does not make much practical sense on the first instance, it will be apparent from the following discussion that, to be most universal, a decay should typically be considered at each pixel location. In addition, having started with a value of zero, and using a decay rate of one, the application of the decay rate to zero will result in a negative number which, in actual practice, may simply be normalized back to zero whenever a negative value is encountered.

Assuming then, at pixel (0,0,2) that the internal variable is equal to zero, a comparison is first made to the intensity value at the "current" location, which is two, and since two is greater than the value of the internal variable after application of the decay rate, the pixel at (0,0) retains an intensity value of two, as shown in FIG. 4B. Additionally, the internal variable is itself overwritten with an intensity value of two, since the intensity value at the current location is larger than the internal variable value with the decay rate added. Next, the value of the internal variable is decremented and compared to the intensity value at the lower adjacent pixel at (0,1), which is zero. Since the value of the internal variable is now equal to one, the intensity value at this pixel location is overwritten, leading to a result of (0,1,1) as shown in FIG. 4B.

A comparison is now made to the next pixel in the X direction, that at (1,0), which currently exhibits a value of three. The value of the internal variable is therefore overwritten with a value of three, which is the intensity at position (1,0) as shown in FIG. 3A, resulting in a retained intensity value (1,0,3) as shown in FIG. 3B, and a new internal variable value of three. However, this value is immediately decremented to a value of two, then used for comparison to the lower adjacent pixel, as before. Since the lower adjacent pixel holds a value of one, the result of the comparison overwrites it to a value of 2, leading to a result of (1,1,2), as shown in FIG. 4B.

With an internal variable value of 2, a comparison is now made to the next pixel in the X direction, that at position (2,0). Since the value at this position was previously a one, it is increased to a value of two, and the internal variable is automatically decremented by the decay rate, leading to a value of one. In the Y dimension, the lowermost adjacent pixel value at positions (2,1) holds an intensity value of zero, and with the internal variable having been decremented to one, it is still larger than the intensity value at this position and it is therefore rewritten to a value of one, leading to a result of (2,1,1) as shown in FIG. 4B.

With an internal variable value of one, comparison is now made to the value at pixel position (3,0) which exhibits a value of two. Since this is greater than the current internal variable value, the intensity value at this position is left alone, and the internal variable value is increased to a value of two. The internal variable value is decremented once again leading to a value of one, and, through comparison in the Y dimension, the previously existing intensity value of zero at location (3,1) as shown in FIG. 4A, produces a result of (3,1,1), as depicted in FIG. 4B.

A comparison is now made with the intensity value at position (4,0). Since the value at this location was a zero, as shown in FIG. 4A, the value at this location is overwritten with that of the internal variable value, leading to a result of (4,1,1), as shown in FIG. 4B. In the Y dimension, having decremented the internal variable value from a one down to a level of zero, a comparison with the intensity at position (4,1) which was previously a zero in FIG. 4A, causes the intensity at position (4,1) to remain the same, leading to a result of (4,1,0), as shown in FIG. 4B.

By continuing these steps, it should be apparent to the reader that with intensity values of one now at positions (1,1), (3,1) and (4,1), each will decay down to a value of zero in the Y dimension. At position (1,1), however, given the intensity value of two which now exists in FIG. 4B, in the Y dimension, it will decay down to a value of one, leading to a result of (2,2,1), and from there, will further decay down to zero in the Y dimension.

Thus, as should be evident from FIGS. 4A and 4B, that a morphological operation according to the invention causes the set of intensity values in FIG. 4A to gradually decay into a controlled result as though a large number of steps were carried out with a particular shape, when, in fact, minimum buffering is used with as few as two passes through an entire set of image pixel intensity values, as just described.

The adaptive thresholding algorithm uses the biased average of an image individually transformed by a dilation and an erosion operation. For clarity, FIG. 5 illustrates the method in a single spatial dimension. The decay rate used for the shape generation controls how quickly the threshold adjusts to varying intensities. A bias is added to the average to reduce noise. Effectively it sets a minimum value that the intensity deviations have to exceed for a pixel to be counted as part of the foreground.

What is claimed is:

1. A method of performing a morphological operation on an image with rows and columns of pixels, including a last row, each pixel having associated therewith an intensity value, the pixels being arranged within two sets of opposing corners, the method comprising the steps of:

a) initializing an internal variable value and a rate function;

b) selecting one of the corners of the image as a current position on a current row having an end position;

c) comparing the value of the internal variable with the intensity value of the pixel at the current position;

d) overwriting the intensity value of the pixel at the current position with the value of the internal variable if the relationship between the current-position intensity value and the internal variable value meet a first predetermined condition;

e) overwriting the value of the internal variable with the intensity value at the current position, thereby creating a new modified internal variable value, if the intensity value of the pixel at the current position at that of the previously modified internal variable value meet a second predetermined condition;

f) indexing the value of the current position along the current row in the general direction of the opposing corner;

g) modifying the internal variable value in accordance with the rate function;

h) comparing the value of the internal variable, as modified, with the intensity value of the pixel adjacent to that of the current position in the next row, the next row being defined as that generally toward the corner opposite of the corner selected;

i) overwriting the intensity value of the adjacent pixel with the value of the modified internal variable if the relationship between the intensity value of the adjacent pixel and the modified internal variable value meet a third predetermined condition;

j) repeating steps c) through i) until the end position is reached, not performing steps d) and e) with respect to the end position;

k) substituting the adjacent row for the current row;

l) selecting the corner opposite to the one selected in step b); and m) repeating steps c) through j) until the end position is reached, not performing steps d) and e) with respect to the end position.

2. The method of claim 1, wherein the morphological operation is a dilation operation, and wherein:

in step a), the internal variable value is initialized to a value which is low as compared to the pixel intensity values;

in step g), the step of modifying the internal variable value in accordance with the rate function causes the internal variable to be reduced;

in step i), the third predetermined condition is that the modified internal variable is greater than the intensity value of the adjacent pixel;

in step d), the first predetermined condition is that the value of the modified internal variable value is greater than the intensity value of the pixel at the current position; and in step e), the second predetermined condition is that the intensity value at the current position is greater than the value of the internal variable, as previously modified.

3. The method of claim 2, wherein, in step a), the internal variable value is initialized to a value of zero.

4. The method of claim 2, wherein the results of the dilation operation are subsequently used to define an adaptive threshold.

5. The method of claim 1, wherein the morphological operation is an erosion operation, and wherein:
- in step a), the internal variable value is initialized to a value which is high as compared to the pixel intensity values;
- in step g), the step of modifying the internal variable value in accordance with the rate function causes the internal variable to be increased;
- in step i), the third predetermined condition is that the modified internal variable is less than the intensity value of the adjacent pixel;
- in step d), the first predetermined condition is that the value of the modified internal variable value is less than the intensity value of the pixel at the current position; and
- in step e) the second predetermined condition is that the intensity value at the current position is less than the value of the internal variable, as previously modified.

6. The method of claim 5, wherein the results of the erosion operation are subsequently used to define an adaptive threshold.

7. A method of dilating an image with rows and columns of pixels, including a last row, each pixel having associated therewith an intensity value, the pixels being arranged within two sets of opposing corners, the method comprising the steps of:
- a) initializing an internal variable value and a decay rate, the internal variable value being relatively low as compared to the pixel intensity values, and the decay rate being negative;
- b) selecting one of the corners of the image as a current position on a current row having an end position;
- c) comparing the new internal variable value with the intensity value of the pixel at the current position, and, if the new internal variable value is greater than the intensity value of the pixel at the current position:
  overwriting the intensity value of the pixel at the current position with the value of the new internal variable value, if the intensity value of the pixel at the current position is greater than the new internal variable value, overwriting the new internal variable value with the intensity value of the pixel at the current position;
- d) adding the decay to the internal variable value to create a new internal variable value;
- e) comparing the new internal variable with the intensity value of the pixel adjacent to that of the current position in the next row, the next row being defined as that generally toward the corner opposite of the corner selected;
- f) overwriting the intensity value of the adjacent pixel with the new internal variable if the new internal variable is greater than the intensity value of the adjacent pixel;
- g) indexing the value of the current position along the current row in the general direction of the opposing corner;
- h) repeating steps c) through g) until the end position is reached, not performing steps d) and e) with respect to the end position;
- i) substituting the adjacent row for the current row, and repeating steps c) through h) until the last row is reached;
- j) selecting the corner opposite to the one selected in step b); and
- k) repeating steps c) through i) until the end position is reached, not performing steps d) and e) with respect to the end position.

8. The method of claim 5, wherein, in step a), the internal variable value is initialized to a value of zero.

9. The method of claim 5, wherein the resulting dilation is used to define an adaptive threshold.

10. A method of eroding an image with rows and columns of pixels, including a last row, each pixel having associated therewith an intensity value, the pixels being arranged within two sets of opposing corners, the method comprising the steps of:
- a) initializing an internal variable value and a decay rate, the internal variable value being relatively high as compared to the pixel intensity values, and the decay rate being positive;
- b) selecting one of the corners of the image as a current position on a current row having an end position;
- c) comparing the new internal variable value with the intensity value of the pixel at the current position, and, if the new internal variable value is less than the intensity value of the pixel at the current position, then:
  overwriting the intensity value of the pixel at the current position with the value of the new internal variable value, if the intensity value of the pixel at the current position is less than the new internal variable value, then:
  overwriting the new internal variable value with the intensity value of the pixel at the current position;
- d) adding the decay rate to the internal variable value to create a new internal variable value;
- e) comparing the new internal variable with the intensity value of the pixel adjacent to that of the current position in the next row, the next row being defined as that generally toward the corner opposite of the corner selected;
- f) overwriting the intensity value of the adjacent pixel with the new internal variable if the new internal variable is less than the intensity value of the adjacent pixel;
- g) indexing the value of the current position along the current row in the general direction of the opposing corner;
- h) repeating steps c) through g) until the end position is reached, not performing steps d) and e) with respect to the end position;
- i) substituting the adjacent row for the current row, and repeating steps c) through h) until the last row is reached;
- j) selecting the corner opposite to the one selected in step b); and
- k) repeating steps c) through i) until the end position is reached, not performing steps d) and e) with respect to the end position.

11. The method of claim 10, wherein the resulting erosion is used to define an adaptive threshold.

12. A method of performing an adaptive threshold operation on a two-dimensional image, comprising the steps of:
- a) dilating the image using a decaying, propagating reference signal in both dimensions;
- b) eroding the image in both dimensions using the steps of claim 7; and
- c) averaging the results of the dilation and erosion steps, wherein the decay rate of the reference signal controls how quickly the threshold adjusts to varying intensities in the image.

13. A method of performing an adaptive threshold operation on a two-dimensional image, comprising the steps of:
 a) dilating the image using a decaying, propagating reference signal in both dimensions;
 b) eroding the image in both dimensions using the steps of claim 10; and
 c) averaging the results of the dilation and erosion steps, wherein the decay rate of the reference signal controls how quickly the threshold adjusts to varying intensities in the image.

* * * * *